United States Patent
Buchheim et al.

[11] Patent Number: 5,892,435
[45] Date of Patent: Apr. 6, 1999

[54] TRIGGERING PROCESS FOR PASSIVE SAFETY DEVICES IN VEHICLES

[75] Inventors: Timm Buchheim, Schwäbisch Hall; Gerhard Schäfer, Weinsberg, both of Germany

[73] Assignee: Temic Telefunken microelectronic GmbH, Heilbronn, Germany

[21] Appl. No.: 855,568

[22] Filed: May 13, 1997

[30] Foreign Application Priority Data

May 14, 1996 [DE] Germany ............ 196 19 414.8

[51] Int. Cl.⁶ .................................................. B60Q 1/00
[52] U.S. Cl. ...................... 340/438; 340/436; 280/734; 280/735
[58] Field of Search ............................ 340/438, 436, 340/437; 280/734, 735, 736

[56] References Cited

U.S. PATENT DOCUMENTS

| | | | |
|---|---|---|---|
| 5,021,678 | 6/1991 | Diller | 280/734 |
| 5,037,129 | 8/1991 | Fritz et al. | 280/734 |
| 5,182,459 | 1/1993 | Okano et al. | 340/438 |
| 5,189,311 | 2/1993 | Moriyama et al. | 280/735 |
| 5,363,303 | 11/1994 | Kaneko et al. | 280/735 |
| 5,365,114 | 11/1994 | Tsurushima et al. | 280/734 |
| 5,424,583 | 6/1995 | Spies et al. | 280/735 |
| 5,483,451 | 1/1996 | Ohmae et al. | 280/735 |

FOREIGN PATENT DOCUMENTS

| | | |
|---|---|---|
| 0311039 | 4/1989 | European Pat. Off. . |
| 0517253 | 12/1992 | European Pat. Off. . |
| 2123359 | 1/1972 | Germany . |
| 3001780 | 7/1981 | Germany . |
| 3717427 | 2/1989 | Germany . |
| 3816587 | 11/1989 | Germany . |
| 3816588 | 11/1989 | Germany . |
| 4208714 | 9/1992 | Germany . |
| 4117811 | 12/1992 | Germany . |
| 4218483 | 12/1992 | Germany . |
| 4330486 | 3/1995 | Germany . |
| 4424551 | 1/1996 | Germany . |
| 19537546 | 4/1997 | Germany . |
| 90/09298 | 8/1990 | WIPO . |
| 93/09008 | 5/1993 | WIPO . |

*Primary Examiner*—Jeffery A. Hofsass
*Assistant Examiner*—Anh La
*Attorney, Agent, or Firm*—Venable; George H. Spencer; Norman N. Kunitz

[57] ABSTRACT

A process for triggering a passive safety device for vehicle occupants inside a vehicle, in particular airbags, pretensioning systems, buckle switches, and roll-over bars, where—by means of electric sensors, an evaluation circuit evaluating the acceleration signals of these sensors, and triggering agents—the safety devices are triggered if the acceleration signals indicate a vehicle condition which may be potentially hazardous for the vehicle occupants. According to the invention, sensor signal characteristics will be generated from quantified sensor signals by means of an evaluation function; these sensor signal characteristics will then be differentiated and fed into an amount calculation function. The up-integrated values of these amounts will then be compared to a trigger threshold so that safety devices can be triggered, if necessary. The process according to the invention allows vehicle crash events to be fully classified whilst at the same time being easy to implement in terms of actual hardware and software requirements.

23 Claims, 8 Drawing Sheets

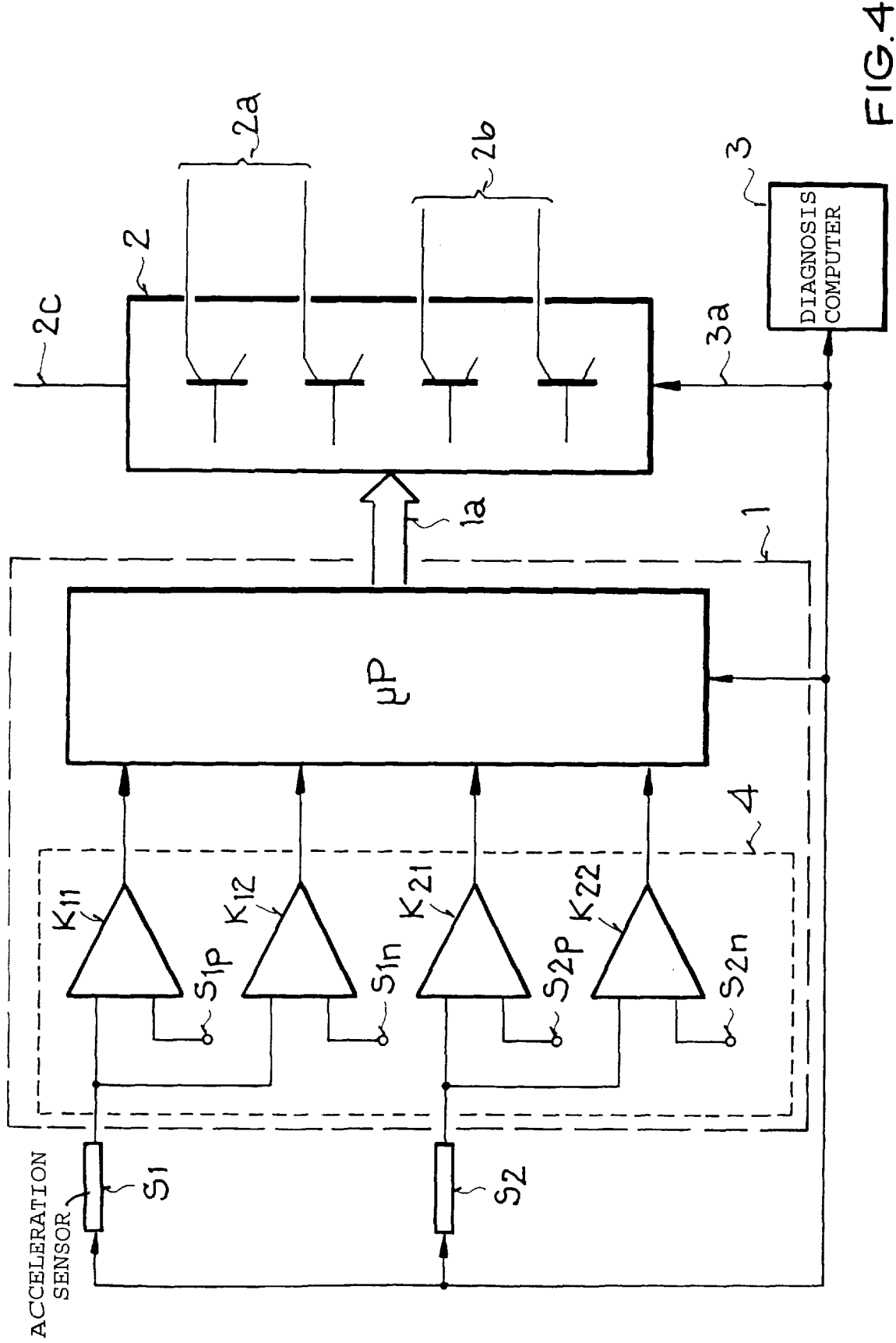

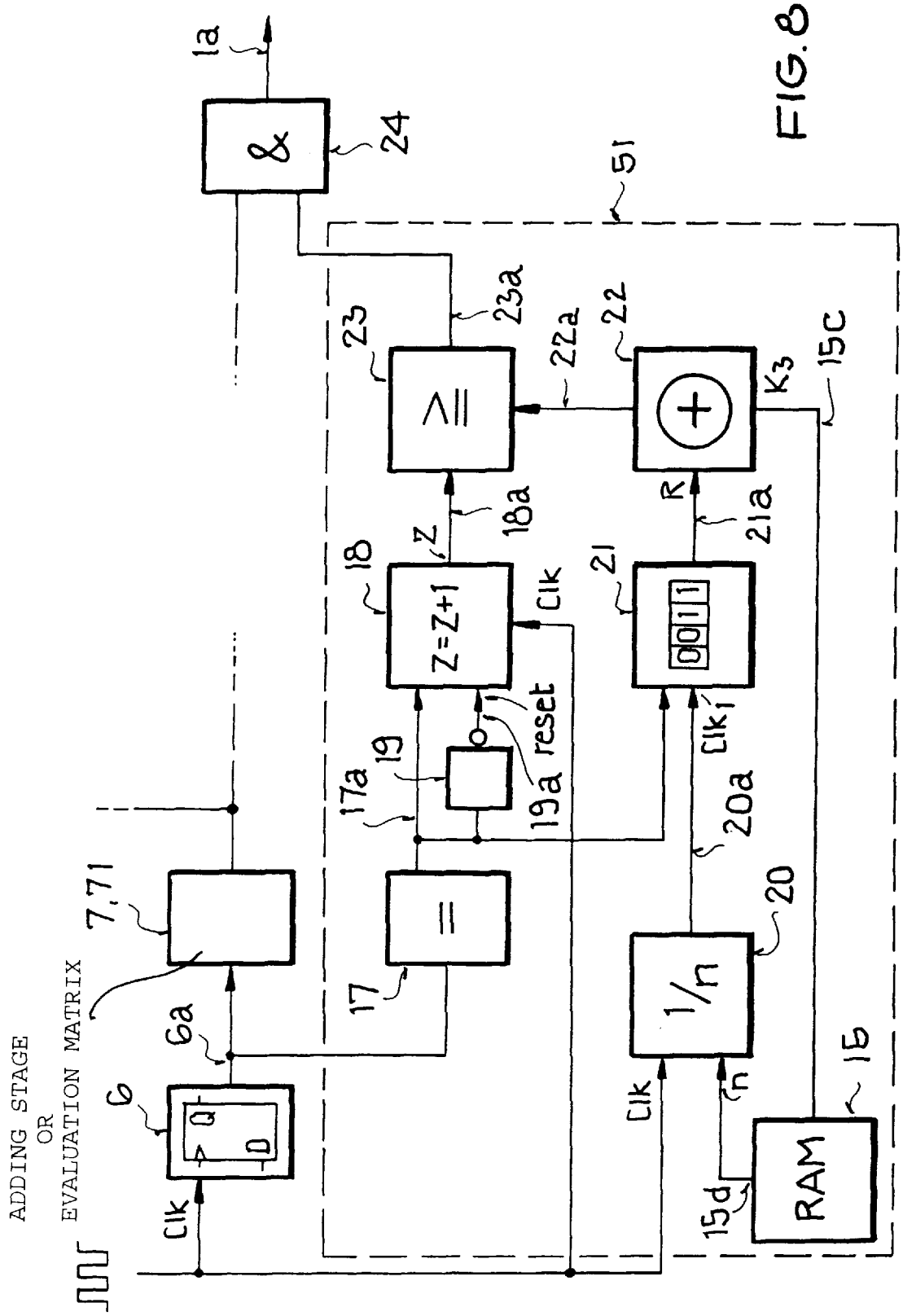

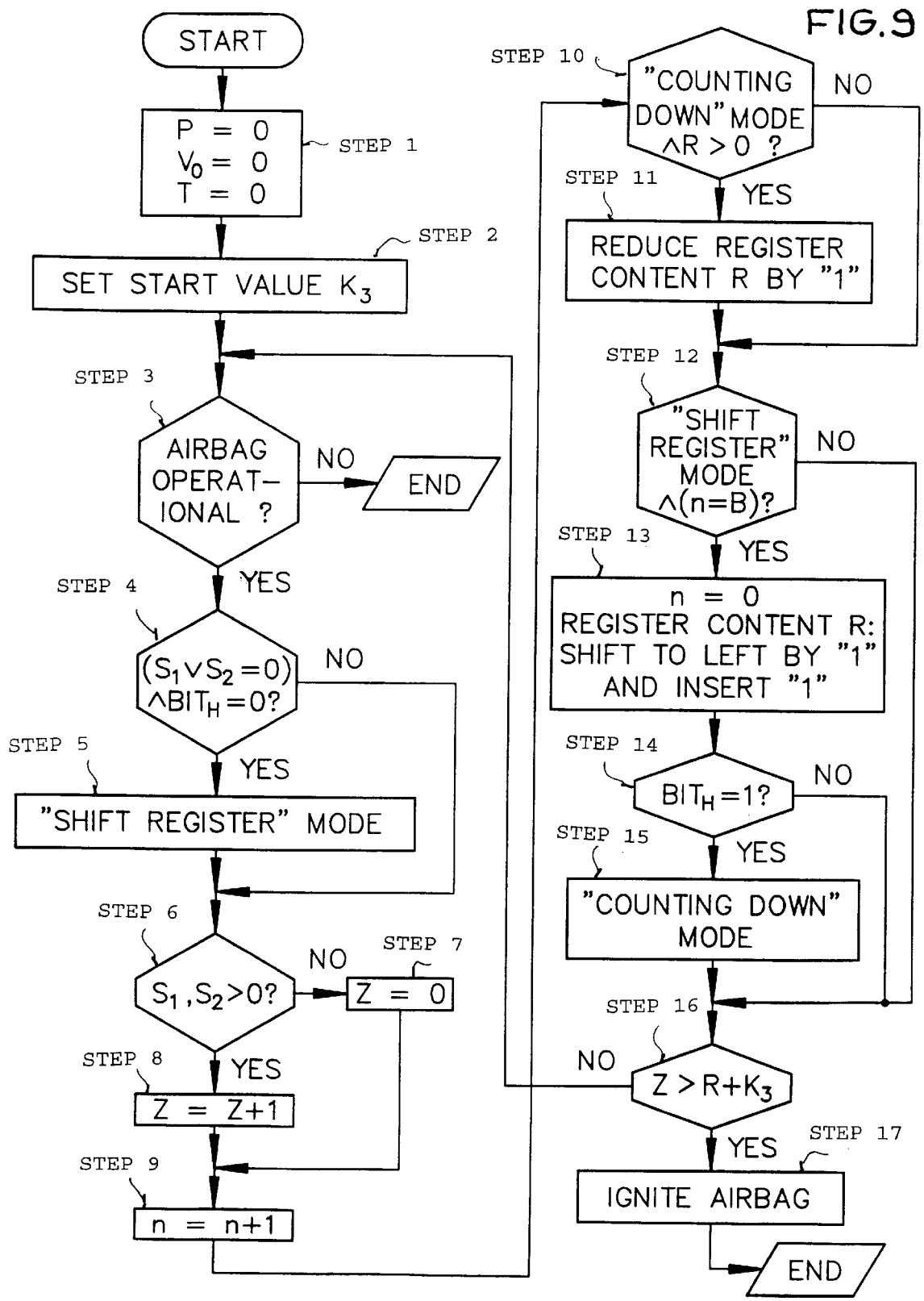

TRIGGERING PROCESS FOR PASSIVE SAFETY DEVICES IN VEHICLES

BACKGROUND OF THE INVENTION

The invention concerns a process for triggering a passive safety device for vehicle occupants inside a vehicle where—by means of electric sensors that detect a critical vehicle condition, an evaluation circuit, and triggering agents for the safety device—an activation of these triggering agents is effected in relation to the acceleration signals supplied by the sensors.

Passive safety devices for motor vehicles, such, as, e.g., airbag systems, pretensioning systems, or roll-over bars, serve to protect vehicle passengers from injuries in the event of a vehicle collision (crash) occurring.

Known triggering processes of such safety devices will feed the acceleration signals, which are generated either by a single or even by two acceleration sensors, into an integration device in order to compare then the integration value with a crash threshold, and subsequently trigger the passive safety device if necessary.

Before acceleration signals are integrated these will usually be amplified, filtered, and fed to an unsymmetrical limiter as known from DE 38 16 587 A1. By means of a differential circuit a reference value will be subtracted from any signal generated in this way; and only then will it be fed into an integrator. Further processing of the integrated acceleration signal is effected by means of analog technology.

In addition to the analog processing of acceleration signals, their digital processing is also known, for example from DE 37 17 427. There, the acceleration signals of two sensors will be fed into a sample and hold circuit after amplification and filtering; the output signals of such a sample and hold circuit are digitized by means of a post-connected A/D converter. These digitized sensor signals are then processed by a microprocessor.

Such digital processing is also known from DE 30 01 780 C2 where the acceleration signals are converted by means of an 8 bit analog/digital converter and processed by an 8 bit processor.

The cost and effort entailed by such 8 bit processing is not inconsiderable as it involves a very high memory storage and calculation requirement.

Finally, from DE 41 17 811 C2, a process for evaluating sensor signals is known where these signals are first digitized as acceleration signals after analog processing. These digitized acceleration signals will be entered over a predefined time period in succeeding time intervals and stored within a shift register. The difference calculated from the current acceleration value and the previous acceleration value lying in the past by the said predefined time period will then be fed into an integrator in order to calculate the differential velocity whose value is used as a trigger criterion. However, in order to implement storage and difference calculation an 8 bit resolution will be required here also.

SUMMARY OF THE INVENTION

The object of the invention is to provide a process of the type described above which requires only a narrow bit width for processing the acceleration signals and which can therefore be implemented with low software and hardware requirements, and still feature a 100% certainty with respect to crash detection.

According to the invention the sensor signals supplied by the acceleration sensors will be quantified; next, sensor signal characteristics will be generated by means of an evaluation function. These sensor signal characteristics will be differentiated and their amounts then up-integrated. Finally, the up-integrated values will be compared to a trigger threshold and the safety device triggered, if necessary. With the process according to this invention, the increase values of the sensor signals will be detected, processed, and evaluated in each time interval of a specified time pattern.

The process according to this invention allows a low cost technical circuit implementation. In particular, following quantification, digital processing of the sensor signals is an option here as, for example, when two sensors complete with two thresholds are used for quantification, a maximum of 4 bits only need to be processed together. This low bit width is made possible by the large input quantification so that the trigger threshold can also be set by digital means. In addition, implementation of the process steps following quantification may also be effected by means of an existing processor or an additional mini-processor (4 bit).

Preferably, with this process according to the invention, addition of the quantified sensor signals can be used as an evaluation function so that, for example, when two sensors complete with two thresholds respectively are used, there is a very simple process allowing all crash types to be classified at 100%. If, however, in this embodiment of the invention the sensitivity axes of two acceleration sensors are installed at an angle of +45° or −45° against the longitudinal axis of the vehicle in the direction of travel, then all direction information supplied by these acceleration sensors will be lost.

In another advantageous application of the invention, this direction information will not be lost if—instead of using addition as an evaluation function—an evaluation matrix is provided such that each quantified sensor value can be allocated a sensor signal characteristic from the evaluation matrix.

This effects an additional evaluation of the quantified sensor signals in relation to the direction information which will cause a significant comparative improvement in ignition behavior relative to the process where addition is used as an evaluation function. Advantageously, the matrix values can be selected in relation to the vehicle signature and thus be made consistent with the relevant vehicle by means of the crash data.

The process according to the invention becomes particularly advantageous if the quantification of sensor signals is effected by means of two threshold values. These will be selected such that a positive or negative acceleration is detected; therefore, the information types "no acceleration", "positive acceleration"; and "negative acceleration" are available as quantified sensor values.

Additionally, in some cases the use of two positive thresholds will cause the process according to the invention to be improved with regard to its trigger behavior over time. These thresholds will be defined such that the information types "no acceleration", "low positive acceleration", and "high positive acceleration" are applied.

In a further preferred embodiment of the invention the quantified sensor values of two sensors will be subjected to an equivalence (identity) function as a further evaluation function, with equivalence (identity) being present if the sensor signals of the two sensors simultaneously indicate positive acceleration. If such an equivalence (identity) function supplies a positive result for sensor values that succeed each other in time, a linearly increasing crash signal will be generated. In addition, for any first-time occurrence of a positive result of this equivalence (identity) function an increasing crash threshold will be generated, with triggering being effected when the crash signal value reaches this crash threshold. If such an equivalence (identity) function is used the crash signal will be controlled such that it starts with relatively small values and then rises relatively sharply in line with the specified time pattern. This will cause an excellent time behavior, that is, it will lead to a very fast ignition of the safety devices in the event of a vehicle crash hazardous to vehicle occupants.

If a crash threshold with an exponential course is preferably selected, then this has the advantage that the process according to the invention can cause the safety devices to be triggered at the start of a crash event only.

For implementing the process according to the invention, a device according to claims 9 to 14 will be stated. According to these Claims, comparators are used for quantifying the sensor signals; the output values of these comparators are preferably fed to D flip flops for intermediate storage.

Furthermore, in another advantageous embodiment two acceleration sensors are used such that their sensitivity axes are located at an angle of +45° or −45° against the longitudinal axis of the vehicle in the direction of travel. In such an embodiment a 3×3 matrix will be preferred for use as an evaluation matrix.

Implementation of the equivalence (identity) function as an evaluation function is effected by means of a comparator, with a counter unit being post-connected to this comparator for implementing the crash signal.

Implementation of the associated crash threshold requires a timing generator, a shift register operated as a counter unit, and an adding stage post-connected to this shift register, with the adding stage providing the crash threshold, the content of the shift register in the adding stage being added up to result in a start value, and the shift register being post-connected to the comparator such that it starts counting as soon as there is an equivalence (identity) of quantified sensor signals and the shift pulse is generated by the timing generator.

BRIEF DESCRIPTION OF THE DRAWINGS

The process according to the invention is to be illustrated and elucidated by means of embodiments in connection with the drawings, wherein:

FIG. 4 is an evaluation unit 1 according to FIG. 1 built up by means of a processor, FIG. 8 is a block circuit diagram of a further embodiment for implementing the process according to the invention, FIG. 9 is a program flow chart for software implementation of the circuit layout function according to FIG. 8.

DETAILED DESCRIPTION OF THE PREFERRED EMBODIMENTS

Figure 1:
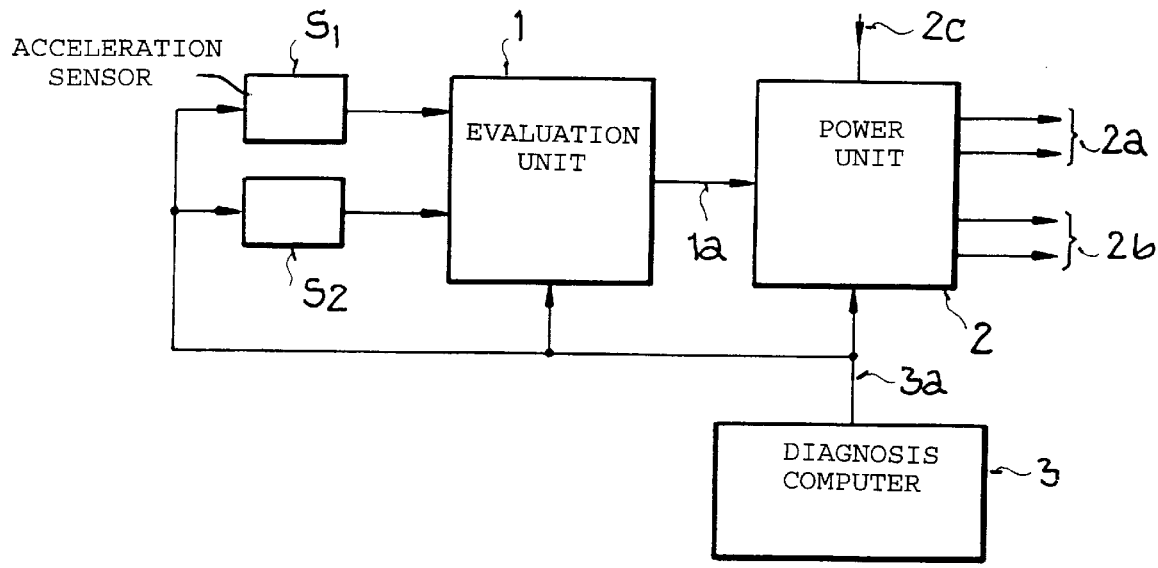
FIG. 1 is a block circuit diagram for an airbag control unit as an embodiment of the process according to the invention.

FIG. 1 shows an airbag control unit for motor vehicles complete with function blocks evaluation unit 1, power unit 2, and a diagnosis computer 3. The acceleration signals supplied by two acceleration sensors S1 and S2 are fed into evaluation unit 1 for evaluation; based on these sensor signals, evaluation unit 1 will determine the vehicle state. If these acceleration signals indicate an impending vehicle crash, ignition commands will be passed via line 1a to power unit 2. If it receives ignition commands, this power unit will generate ignition signals for the trigger agents of airbags 2b, pretensioning system 2a, and buckle switch 2c. The diagnosis computer 3 monitors and checks the functionality of the entire system.

Figure 3:
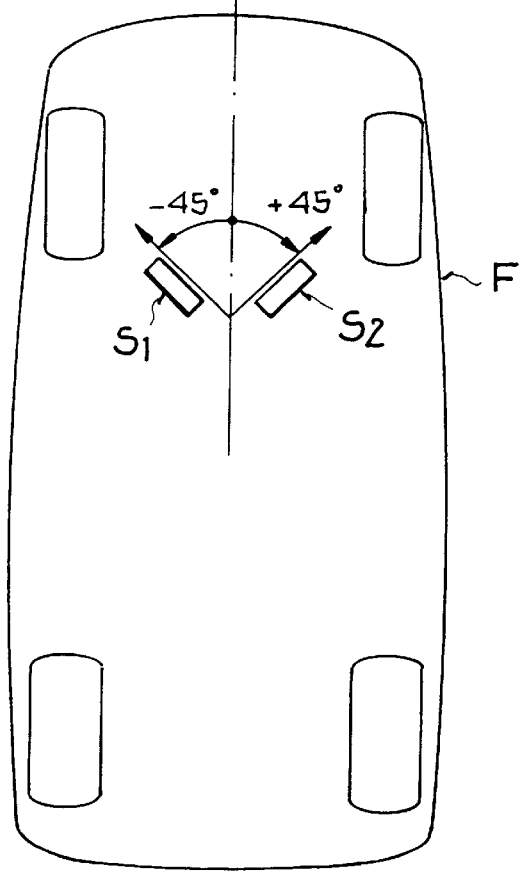
FIG. 3 is an illustration of the sensors as they are controlled in a vehicle.

According to FIG. 3 the sensors S1 and S2 are offset against each other by 90°, and, respectively, by 45° against the direction of travel P in vehicle F, so that the sensor signals also provide information with regard to the direction of impact.

Figure 2:
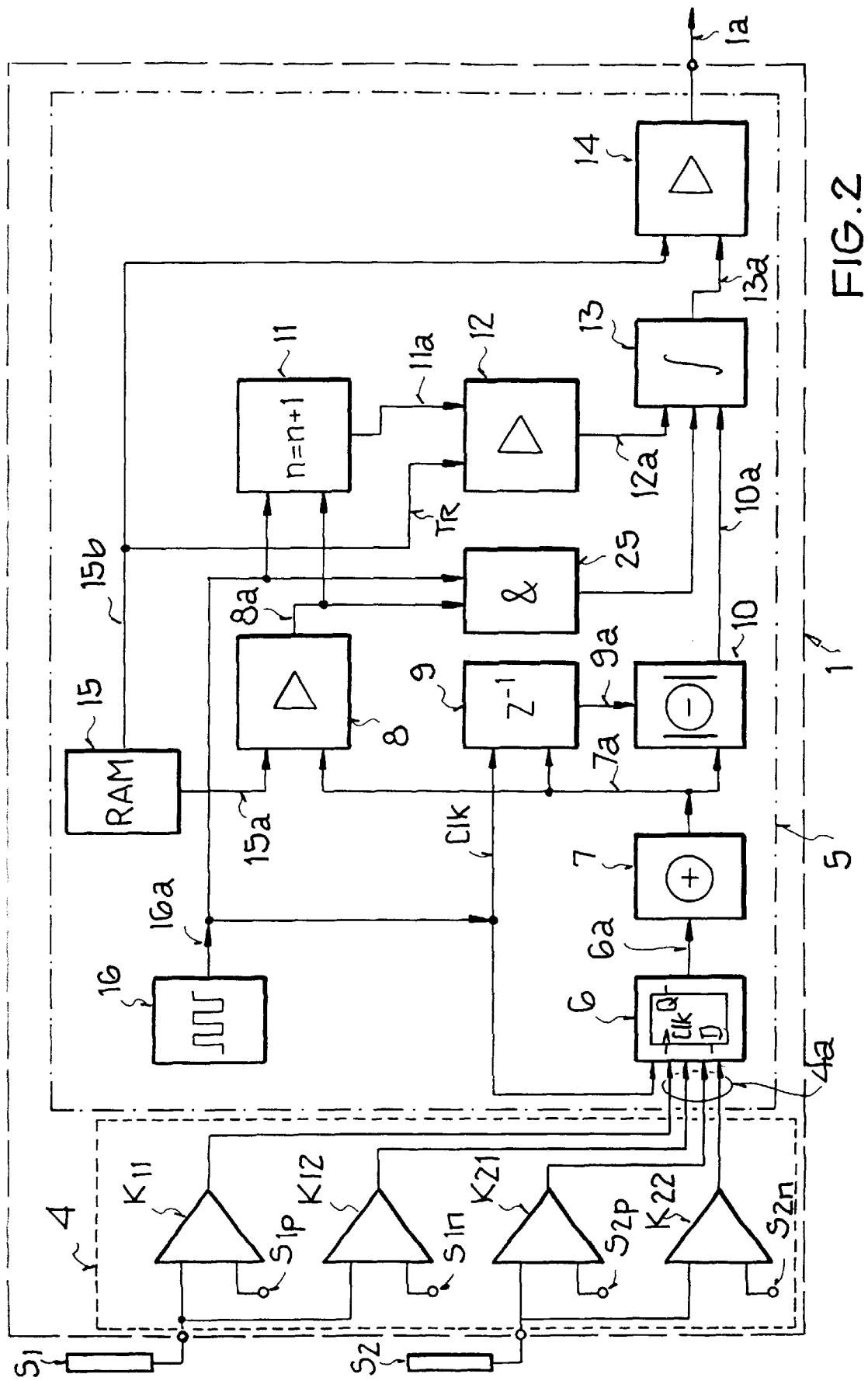
FIG. 2 is a circuit layout for evaluation unit 1 according to FIG. 1.

A hardware implementation of evaluation unit 1 according to FIG. 1 is shown in FIG. 2 and comprises a quantification unit 4 and an evaluation circuit 5.

For quantifying the sensor signals the acceleration signal of sensor S1 will be fed respectively into two comparators K11 and K12, and the sensor signals of sensor S2 into two further comparators K21 and K22. A positive and a negative threshold s1n, s1p or s2n, s2p are used as thresholds for quantification:

sensor S1:s1p and s1n where s1p>s1n, sensor S2: s2p and s2n where s2p>s2n.

The output of quantification unit 4 thus has 4 lines 4a that are applied to the input of an intermediate storage device 6 designed with D flip flops.

On each of these lines the information types "no acceleration", "positive acceleration", or "negative acceleration" are available for each sensor S1 or S2. Thus, on 4 lines, there are only 6 different types of information that are buffered by means of intermediate storage device 6 at constant time periods defined by a clock pulse signal clk. To this end, the clock pulse signal clk generated by a clock pulse generator 16 is fed into this intermediate storage device 6 via a line 16a, so that the sensor values are applied at its output until the next clock pulse occurs and are thus available at the same time, via a line 6a, at the input of a post-connected adding stage 7. In this adding stage 7, the quantified sensor signals are added up such that their sum, for each clock pulse, is available at the output of the adding stage 7 as a 3 bit vector, which sum is then fed via a line 7a to post-connected processing units.

This addition represents an evaluation function which is applied to the quantified sensor signals in order to generate with each clock pulse a sensor signal characteristic, that is, the sum. By way of example, the truth table of such an evaluation function for the two sensors S1 and S2 is to be shown below, with the sensitivity axes of these two sensors being arranged according to FIG. 3. Thus sensor S1—viewed in the direction of vehicle travel—can be designated as a left-hand sensor, and the sensor S2 can be designated as a right-hand sensor.

| | left-hand sensor S1 | | right-hand sensor S2 | | output adding stage 7 | |
|---|---|---|---|---|---|---|
| | s1p | s1n | s2p | s2n | vector V | dec |
| 1 | 0 | 0 | 0 | 0 | (0,0,0) | 0 |
| 2 | 1 | 0 | 0 | 0 | (0,0,1) | +1 |
| 3 | 0 | 1 | 0 | 0 | (1,0,1) | −1 |
| 4 | 0 | 0 | 1 | 0 | (0,0,1) | +1 |
| 5 | 1 | 0 | 1 | 0 | (0,1,0) | +2 |
| 6 | 0 | 1 | 1 | 0 | (0,0,0) | 0 |
| 7 | 0 | 0 | 0 | 1 | (1,0,1) | −1 |
| 8 | 1 | 0 | 0 | 1 | (0,0,0) | 0 |
| 9 | 0 | 1 | 0 | 1 | (1,1,0) | −2 |

In the columns "left-hand sensor" and "right-hand sensor" this truth table contains the values generated by quantification unit 4. Here, the value "0" indicates that the relevant threshold value was not reached, whilst the value "1" indicates that the relevant threshold has been reached. Thus, "0" signifies that there is neither a positive nor a negative acceleration whilst a "11" indicates a positive or negative acceleration.

In the column "output adding stage 7", located next to the above-described columns, the results of the addition are entered as a 3 bit vector V. Finally, the last column is provided for the relevant decimal value.

As can be seen from this truth table, the evaluation function is defined such that the direction information contained in the sensor signals is essentially lost. Thus the sensor signals received in the event of a vehicle crash involving a front left or front right impact are evaluated as (+1) (see lines 2 and 4) whilst for a corresponding crash involving a left rear or a right rear impact the evaluation is (−1) (see lines 3 and 7).

According to lines 5 and 9, a crash in the direction of travel or against the direction of travel will be evaluated by (+2 or −2).

In all other cases—that is, when the specified thresholds are not reached,—a 0 vector is output by adding stage 7 in the event of a vehicle crash involving an impact from right or left (compare line 6 or line 8).

These vectors V output by adding stage 7 will be fed via the line 7a into a comparator 8, a register 9, and a function unit 10 which calculates the difference and its amount from the vector V currently fed in and a vector $V_0$ generated during the preceding clock pulse. This vector $V_0$ is stored in register 9 and will be fed to function unit 10, via a line 9a, in accordance with the clock pulse.

The operation carried out in function unit 10 corresponds to a differentiation followed by subsequent addition of the sum of quantified sensor values; thus the amount of the increase of successive sum values is applied at line 10a which leads to an integrator 13.

In this integrator 13, the increase values calculated in successive clock pulses will be added up and then form a crash signal P which is compared to a trigger threshold K2 in a post-connected comparator 14. If this trigger threshold K2 is reached by crash signal P, the safety devices will be triggered.

As only positive values are fed to integrator 13, the integrator content would always continue to increase monotonously; this would cause undesirable results to appear. Therefore, this integrator 13 must be reset at specified points in time; this is effected by means of the above-mentioned comparator 8, a counter 11, and a further comparator 12.

Initially, this integrator 13 is to be reset whenever there is no trigger event within a predefined time period. To this end, the counter value generated by counter 11 will be compared, by means of comparator 12, with a time constant $T_R$ provided by a register RAM 15. If the counter value fed to comparator 12 via a line 11a exceeds this time constant $T_R$, a reset impulse will be fed to integrator 13 via a line 12a.

The reset input of counter 11 is connected with the output of comparator 8 which comparator, via a line 8a, feeds its output signals also to an AND gate 25 that simultaneously receives clock pulse signal clk. The clock pulse signal clk will thus be released for the integrator 13 only if there is an output signal provided by comparator 8.

An output signal will be generated by comparator 8 if a vector generated by the adding stage 7 exceeds a counting threshold K1. This counting threshold K1 is provided—via a line 10a—by the register RAM 15.

By way of example, the truth table of such a comparator 8 is to be shown below.

| vector V | output comparator 8 |
|---|---|
| (0,0,0) | 0 |
| (0,0,1) | 1 |
| (0,1,0) | 1 |
| (1,0,1) | 0 |
| (1,1,0) | 0 |

This shows that comparator 8 generates an output signal only for the vectors (0, 0, 1) and (0, 1, 0); that is, only if a crash involving a front left or front right impact or a frontal impact in the direction of travel is to be expected. In such a case counter 11 will be reset to "0" and also causes integrator 13 to be reset if the crash signal P generated by integrator 13 does not reach the trigger threshold K2 within the time constant $T_R$. This trigger threshold K2 is also stored in register RAM 15.

In all other cases of crash events no output signal is generated so that the increase values determined by these vectors V are not up-integrated within integrator 13 as the clock signal clk does not reach the integrator 13.

The two constants K1 and $T_R$ must have been made consistent with each other and will be determined by means of the crash data existing for each vehicle type. Here, these constants must be selected such that a trigger event is forced to occur whenever this is required, i.e., erroneous trigger events must not occur. The process implemented by the circuit layout according to FIG. 2 meets these conditions using appropriately selected constants K1 and $T_R$, and in this way classifies all crash events fully (100%), with ignition delay times remaining within acceptable limits. As the point in time at which the safety devices are triggered must occur within a specified time period following detection of a dangerous crash situation by the sensors, the ignition delay time indicates that time interval which exceeds the aforesaid specified time period.

Instead of a hardware implementation of the process according to the invention, the evaluation of the sensor signals can also be carried out by means of a simple 4 bit processor. Evaluation unit 1 according to FIG. 4 thus comprises a quantification unit 4 and a microprocessor μP. The other function units correspond to those shown in FIG. 1.

Figure 5:
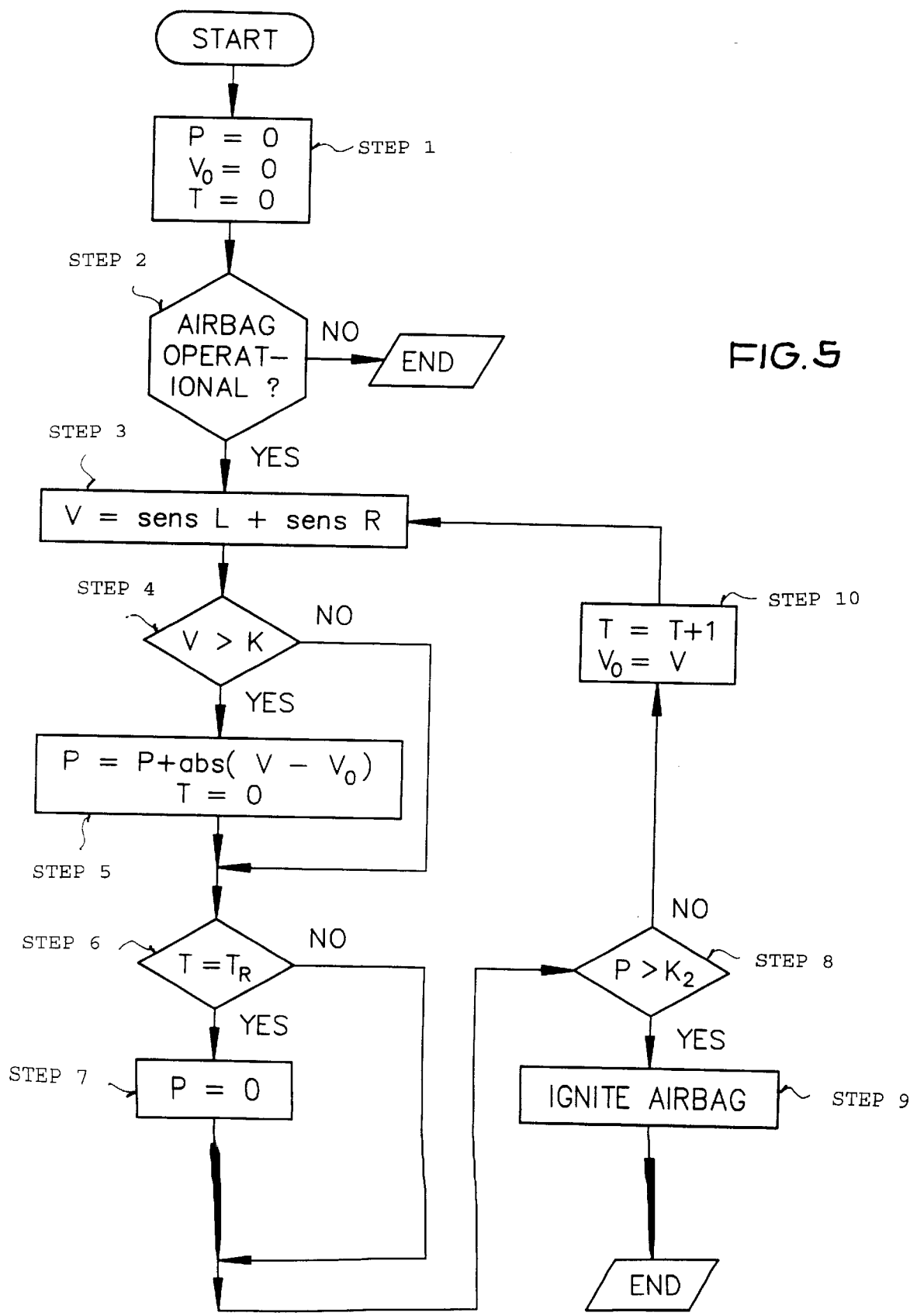
FIG. 5 is a program flow chart for implementing the process according to the invention by means of a microprocessor according to FIG. 4.

A software implementation provided for such a microprocessor μP is shown by the program flow chart according to FIG. 5. Following the start of the program, the program variables P, $V_0$, and T are initialized in step 1. Here, P represents the value of the up-integrated values of the increase amounts, $V_0$ is the vector from a preceding clock pulse, belonging to a vector V, and T indicates the clock pulse.

If it is known in step 2 that the airbag is operational, the sum of the quantified sensor signals sensL and sensR is calculated as vector V. Subsequently, in step 4, this vector V is compared with counting threshold K1 whose signification has already been described in connection with FIG. 2. If vector V exceeds this constant K1, then the absolute amount of the difference between this vector V and the vector $V_0$ that was calculated during the preceding clock pulse will be calculated and up-integrated according to the formula stated, that is, it will be added to the preceding integrator value P. At the same time, clock pulse T will also be set to "0". In any other case, this step 5 will be skipped, and immediately followed by step 6 where the clock pulse will be compared with time constant $T_R$ whose signification has also been described already in connection with FIG. 2. If the clock pulse T reaches this threshold, integrator value P will then be reset in step 7. In any other case, step 7 will be skipped.

If the clock pulse has not reached this time constant $T_R$, the integrator value P will be compared with a trigger threshold K2 in step 8; and, if necessary, the safety devices within the vehicle will be triggered (compare step 9). If trigger threshold K2 has not been reached, clock pulse T will be set to T+1, and the current vector V will become vector $V_0$ (compare step 10) before restarting again at step 3.

Figures 6, 7A, 7B:
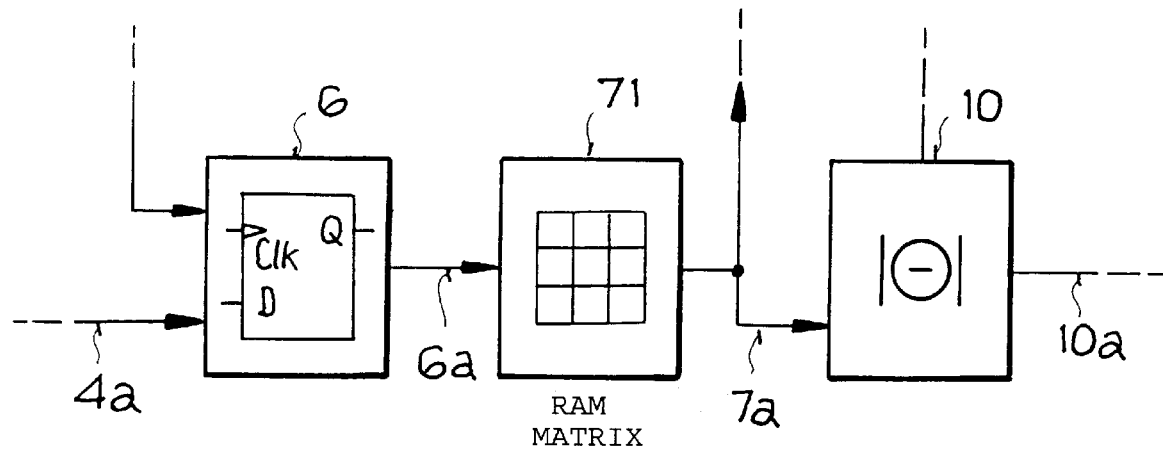
FIG. 6 is a partial illustration of the circuit layout according to FIG. 2 complete with an evaluation matrix instead of the adding stage 7.
FIGS. 7a and 7b show embodiments of an evaluation matrix serving as an evaluation function.

The process according to the invention described by means of FIGS. 2 and 5 is very simple and reliable with regard to the classification behavior. An improvement of the behavior over time will be achieved by means of such an evaluation of the quantified sensor signals that is based on the evaluation of the direction information when using two sensors S1 and S2 arranged within a vehicle according to FIG. 2. FIG. 6 illustrates a hardware implementation of such an evaluation, with only a section of the circuit layout according to FIG. 2 being shown. Instead of the adding stage 7 known from FIG. 2, a parameter matrix is connected in this FIG. 6 as a RAM matrix 71 between the intermediate storage device 6 and function unit 10 whose functions have already been described in connection with FIG. 2. FIGS. 7a and 7b, respectively, show an associated evaluation matrix.

According to the embodiment shown in FIG. 7a, the quantified sensor values of sensors S1 and S2 are each allocated a parameter gi (i=0 . . . 8). Here, the quantified sensor values 0, 1, and −1 represent the information "no acceleration", "positive acceleration", or "negative acceleration". Thus the gi values are applied as 3 bit vectors V at the output of RAM matrix 71; these 3 bit vectors V will then be processed in a fashion corresponding to that used for the vectors V according to FIG. 2. It has been found here that an accuracy of 3 bit for a gi value is sufficient; each individual value can thus lie between −3 and 3. The optimum layout of RAM matrix 71 depends on the respective vehicle signature and must be made consistent with the relevant vehicle by means of crash data.

A further improvement of the behavior in time of the process according to the invention is achieved by means of the evaluation matrix according to FIG. 7b, where quantification of the sensor signals is not effected by means of a positive and negative threshold Sn and Sp, but where both switching thresholds are positive and quantification is effected using a high and a low threshold, that is, where high or low acceleration becomes detectable.

A software implementation is possible even when using such an evaluation matrix as an evaluation function and essentially corresponds to the program flow chart according to FIG. 5, the difference being that the vector is not calculated by adding the quantified sensor values but can be taken from the evaluation matrix.

In addition to the process according to the invention which was described by means of the embodiments according to FIGS. 2 and 6, or FIG. 5, it is possible to effect an additional evaluation of the quantified sensor signals; this will improve ignition time behavior to such an extent that ignition time delays are essentially prevented.

This additional evaluation can be implemented by means of hardware according to the circuit layout shown in FIG. 8, or by means of software according to the program flow chart shown in FIG. 9.

FIG. 8 provides only a partial illustration of the circuit layout according to FIG. 2, with the function unit used for implementing the evaluation function being either designed as an adding stage 7 or an evaluation matrix 71. In this additional evaluation, a trigger threshold Z that can be shifted dynamically in an upward direction will be generated; this trigger threshold Z increases exponentially in line with the specified time pattern. As the threshold is low at the start, this means that this process can trigger only at the start of a crash event. In this way, the safety devices will be triggered directly as soon as a serious crash occurs.

The quantified sensor values placed in intermediate storage will initially be fed to a comparator 17, via a line 6a; this comparator 17 is used to check whether the sensor values— as present and quantified in each time pulse—of sensors S1 and S2 are positive (that is, whether they indicate an impact direction against the direction of vehicle travel). If this is the case, a start impulse is fed via a line 17a into a counter 18 as well as into a function unit 21 that can be operated either as a shift register or as a counter. At the same time such a signal is applied to a NAND gate 19 which, on receiving an appropriate input signal, generates a reset signal for counter 18 via a line 19a.

With regard to this counter 18, such a start signal has the effect that its counter state is increased by "1". In the other case, that is, if both sensor values are not positive, the counter will be reset to "0". In this way, this counter 18 counts those sensor value pairs which successively indicate an acceleration in a positive direction, that is, which fall into the first quadrant.

The counter state Z of this counter 18 now serves as a crash signal and is fed via a line 18a into a further comparator 23 which effects a comparison with the dynamic trigger threshold (R+K3). If this trigger threshold (R+K3) is exceeded by the crash signal Z, the trigger agents of the safety devices will be activated.

This shiftable trigger threshold (R+K3) is generated within an adding stage 22 by adding a count value R coming via a line 21a from function unit 21 and increasing in line with the clock pulse to a start value K3 entered via a line 15c of a RAM register 15.

In order to allow the trigger threshold to increase exponentially the count value R generated by function unit 21 must increase exponentially in line with the clock pulse. This is implemented in combination with a divider stage 20 which, via a line 15d, receives a divider factor n from RAM register 15 as well as, simultaneously, the clock pulse signal clk. This generates a clock pulse signal clk1 with a lower comparative clock frequency than clock pulse signal clk. By means of divider factor n the increase of the exponential trigger threshold can be varied and thus adapted to the vehicle signature.

Below, the task of function unit 21 is to be further described and explained. Initially, it is assumed that its register content is "0". A start impulse generated by comparator 17 now causes a "1" to be written at the bit-lowest point which from this point in time onwards will be shifted to the left at each clock pulse signal clk1 generated by means of divider stage 20, with a "1" being inserted at the same time. This continues until the highest-value bit position has been set. At this time there will be an automatic switchover from the "shift register" function to the "counting down" function. Now register content R will be counted down to "0". As soon as the highest value bit extinguishes during such a countdown (that is, as soon as the highest value bit position is "0"), an impulse generated by the comparator 17 will again be taken into account so that it is possible to switch over again to the "shift register" function.

At first, in the "shift register" function, only small values R="1" and R="11" will be output during the initial time pulses whilst with progressing time pulse the values R will rapidly increase: R="111" and R="1111".

However, counting down is effected on a bit by bit basis and thus considerably slower. The result is that a specified time period needs to expire before the process (that is, switchover to the "shift register" function) can be re-activated.

The program flow chart shown in FIG. 9 represents the software implementation of this expanded evaluation process by means of a microprocessor. Following the start of the program, the counter function Z, divider function n, and register content R will be set to "0" in step 1. In step 2 start value K3 is set whose meaning was described in connection with FIG. 8.

If the safety devices are operational (compare step 3), it will be checked in a step 4 whether one of the sensor signals S1 or S2 is "0" and the highest-value bit position Bit$_H$ is set. If this is the case, the operating mode "shift register" will be activated according to step 5. In any other case, this step 5 will be skipped.

If, according to step 6, both sensor signals S1 and S2 are positive, the counter function Z will subsequently be increased by "1". If this is not the case, the counter will be reset to "0", and only step 9 will be carried out. The divider will be increased from n to n+1 as often as is necessary to reach an upper limit (step 12). When this limit B is reached there will be a shift operation at register R and the divider n will be reset to zero (step 13).

There will be a check in step 10 as to whether a register content (R>0) exists in operating mode "counting down". If this is the case, register content R will be decreased by "1", otherwise this step 11 will be skipped.

However, if the operating mode "shift register" exists according to step 12 and the counter n has reached a threshold B, then the divider n will be reset to "0" and the register content R will be increased by "1, whilst at the same time another "1" value is inserted (compare step no. 13). Threshold B will be selected such that the value in register R changes exponentially over time in an adapted fashion relative to the vehicle type. If the highest-value bit position is set (Bit$_H$=1), the operating mode "counting down" will be set according to step 15, in any other case step 15 will be skipped in order to proceed with the next step 16.

If, however, the operating mode "shift register" (compare step 12) does not exist or if n<B, then the sum of register content R and start value K3 is calculated in step 16, which sum now represents the trigger threshold, and compared to counter state Z. If this trigger threshold is exceeded, the safety devices will be triggered (compare step 17); in any other case there will be a return to step 3.

Figure 10:
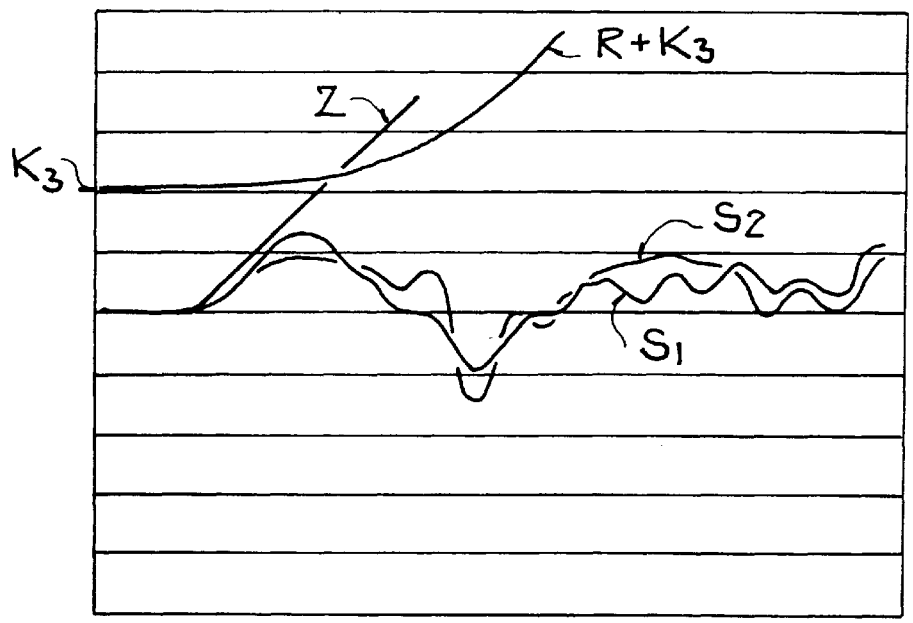
FIG. 10 is a signal diagram for elucidating the process according to the invention as illustrated in FIG. 8.

The diagram according to FIG. 10 shows the operating mode of this evaluation process. The curves S1 and S2 indicate the course of the acceleration signals of sensors S1 and S2 during a crash event. At the start of the crash event both sensor signals simultaneously have positive values so that crash signal Z increases linearly, whilst at the same time the trigger threshold (R+K3) is generated. At the point where these two curves Z and (R+K3) intersect, the safety devices will trigger.

Advantageously, this additional evaluation process can be made consistent with the embodiments described above such that, in addition to a 100% crash classification, an excellent time behavior, that is a very fast trigger response in the event of a crash, is achieved.

What is claimed is:

1. A process for triggering a passive safety device for vehicle occupants inside a vehicle where—by means of electric sensors that detect a critical vehicle condition, an evaluation circuit, and triggering agents for the safety devices—an activation of these triggering agents is effected in relation to the acceleration signals generated by the sensors, wherein the following steps are involved:

(a) quantifying the acceleration signals of a sensor by simultaneously comparing the values of these acceleration signals with a plurality of threshold values, (b) generating sensor signal characteristics from the quantified sensor signals by means of an evaluation function, (c) differentiating the sensor signal characteristics, (d) calculating the amounts of the differentiated sensor signal characteristics, (e) integrating the amounts of the differentiated sensor signal characteristics, and (f) comparing the integrated amounts with a trigger threshold to provide a triggering signal for a triggering agent as a result of the comparison.

2. Process according to claim 1 wherein an addition of the quantified sensor signals is implemented as an evaluation function, and wherein the sum of this addition represents the signal characteristic.

3. Process according to claim 1 wherein an evaluation matrix is provided as an evaluation function such that the quantified sensor values are allocated a signal characteristic from the evaluation matrix.

4. Process according to claim 2 wherein, for each sensor, two threshold values are used for quantification.

5. Process according to claim 4 wherein a positive threshold value and a negative threshold value are used for each sensor.

6. Process according to claim 4 wherein two positive threshold values are used.

7. Process according to claim 6 wherein the quantified sensor values are subjected additionally to an equivalence (identity) function as an evaluation function, where the equivalence (identity) will refer to the sensor signals that simultaneously indicate a positive acceleration; wherein the equivalence (identity) of sensor signals succeeding each other in time will generate a linearly increasing crash signal; wherein an increasing trigger threshold will be generated in relation to the sensor characteristics generated by the equivalence (identity) function; and wherein finally the trigger agents will be activated as soon as the crash signal value reaches the trigger threshold.

8. Process according to claim 7 wherein the trigger threshold features an exponential course.

9. Process according to claim 5 wherein the quantified sensor values are subjected additionally to an equivalence (identity) function as an evaluation function, where the equivalence (identity) will refer to the sensor signals that simultaneously indicate a positive acceleration; wherein the equivalence (identity) of sensor signals succeeding each other in time will generate a linearly increasing crash signal; wherein an increasing trigger threshold will be generated in relation to the sensor characteristics generated by the equivalence (identity) function; and wherein finally the trigger agents will be activated as soon as the crash signal value reaches the trigger threshold.

10. Process according to claim 9 wherein the trigger threshold features an exponential course.

11. Process according to claim 3 wherein, for each sensor, two threshold values are used for quantification.

12. Process according to claim 11 wherein a positive threshold value and a negative threshold value are used for each sensor.

13. Process according to claim 12 wherein the quantified sensor values are subjected additionally to an equivalence (identity) function as an evaluation function, where the equivalence (identity) will refer to the sensor signals that simultaneously indicate a positive acceleration; wherein the equivalence (identity) of sensor signals succeeding each other in time will generate a linearly increasing crash signal; wherein an increasing trigger threshold will be generated in relation to the sensor characteristics generated by the equivalence (identity) function; and wherein finally the trigger agents will be activated as soon as the crash signal value reaches the trigger threshold.

14. Process according to claim 13 wherein the trigger threshold features an exponential course.

15. Process according to claim 11 wherein two positive threshold values are used.

16. Process according to claim 15 wherein the quantified sensor values are subjected additionally to an equivalence (identity) function as an evaluation function, where the equivalence (identity) will refer to the sensor signals that simultaneously indicate a positive acceleration; wherein the equivalence (identity) of sensor signals succeeding each other in time will generate a linearly increasing crash signal; wherein an increasing trigger threshold will be generated in relation to the sensor characteristics generated by the equivalence (identity) function; and wherein finally the trigger agents will be activated as soon as the crash signal value reaches the trigger threshold.

17. Process according to claim 16 wherein the trigger threshold features an exponential course.

18. A process according to claim 8 wherein for quantifying the sensor signals comparators are used.

19. A process according to claim 18 wherein the quantified sensor signals are put into intermediate storage by a D flip flop.

20. A process according to claim 19 including providing two acceleration sensors whose sensitivity axes are oriented at an angle of +45° or −45° against the longitudinal axis of the vehicle in the direction of travel.

21. A process according to claim 16 including providing a 3×3 matrix as an evaluation matrix.

22. A process according to claim 21 wherein the equivalence (identity) function is effected by a comparator complete with a post-connected counter for implementing the crash signal.

23. A process according to claim 22 including implementing the trigger threshold value with a timing generator, a shift register used as a counter unit, and an adding stage post-connected to the shift register, with the shift register being post-connected to the comparator, and with the adding stage adding the content of the shift register to a start value (K#) in order to generate the trigger threshold (K3+R).

* * * * *